J. RICHEY.
Seeder.
No. 217,151. Patented July 1, 1879.
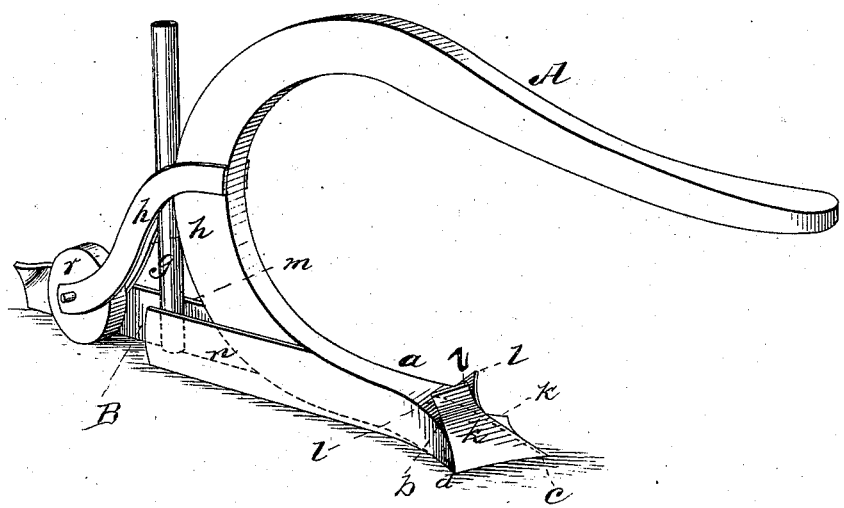
WITNESSES
INVENTOR
James Richey
by E.W. Anderson
his ATTORNEY

UNITED STATES PATENT OFFICE.

JAMES RICHEY, OF TONICA, ILLINOIS.

IMPROVEMENT IN SEEDERS.

Specification forming part of Letters Patent No. 217,151, dated July 1, 1879; application filed April 7, 1879.

*To all whom it may concern:*

Be it known that I, JAMES RICHEY, of Tonica, in the county of La Salle and State of Illinois, have invented a new and valuable Improvement in Seeders; and I do hereby declare that the following is a full, clear, and exact description of the construction and operation of the same, reference being had to the annexed drawing, making a part of this specification, and to the letters and figures of reference marked thereon.

The drawing is a representation of a perspective view of my improved seeder.

This invention has relation to means for drilling winter grain into clover and stubble lands; and it consists, mainly, in the construction and novel arrangement of the reverse-curved iron beam, said beam having its point portion enlarged somewhat in diamond form and laterally-beveled on each side, and provided with a small point and upwardly-curved flanges, and, extending behind said beam, an open heel formed by the land-side and a short plate parallel thereto, respectively attached to the beam sides, a seeding-tube extending down into said open heel, and a covering device, all as hereinafter shown and described.

In the accompanying drawing, the letter A designates the curved iron beam, the curvature extending from the point portion backward, upward, and then forward, to form the beam proper, as shown.

The point portion $a$ of the beam is inlaid in diamond form with lateral and forward bevels, $b$, extending to the apex $c$, and point-shoulders $d$, which project from the side of the main shank $c$ of the point portion, so that the latter will follow easily in the earth when loosened up by the small point or burrower $k$. This is of similar form to the point portion of the beam, and is secured thereto, its upper portion being centrally divided to form two flanges, $l\ l$, which are curved upward and away from the bevels of the point portion, as indicated in the drawing.

The sides of the beam are parallel, and to each side of the point portion is attached a vertical plate, which extends to the rear along the base-line of the point portion, the longer plate, $m$, serving as a land-side, and the shorter plate, $n$, as the guard, the two forming an open heel, B, into which the lower ends of the seeding-tube $g$ extends, said tube being attached behind the beam to the rear curve thereof.

On each side of this tube is attached to the base an arm, $h$, these arms extending to the rear and forming bearings behind the tube for the roller $r$, which serves to cover in the seed which have dropped through the tube.

Sometimes the longer plate or land-side, $m$, is curved inward and downward somewhat at the upper portion of the rear end, forming a coverer, and in this case the roller will not be needed.

The shorter plate, $n$, does not extend to the coverer, but terminates just in rear of the seeding-tube, so that the earth may readily fall in rear of the seed, to be operated on by covering device.

The object of this invention is to seed winter grain in land lying in clover and stubble, which serves to enrich it, and which it is advisable not to clear.

A rolling colter or other suitable cutting device may be used to open the way through the growth, and the burrower loosens up the soil and forms a channel, into which the seed is deposited, the land-side and guard-plate, forming the open heel, serving to make a clear way for the seed, which is then covered in by the following coverer.

I am aware that it is not new to make a reversely-curved metallic beam, and that rolling coverers are old devices arranged in rear of cultivator-shovels, and I do not claim such devices broadly.

What I claim as new, and desire to secure by Letters Patent, is—

The seeding attachment for stubble and clover lands, consisting of the reversely-curved beam A, having the laterally enlarged and beveled diamond-point portion $a$, the burrower-point $k$, secured thereto and having upwardly-curved flanges $l$, dropper-tube $g$, secured behind the beam, the long land-side plate, $m$, and the short guard-plate, $n$, forming an open heel behind the point portion, into which the dropper-tube descends, and the coverer following the tube, substantially as specified.

In testimony that I claim the above I have hereunto subscribed my name in the presence of two witnesses.

JAMES RICHEY.

Witnesses:
ASTOR G. GRAY,
NATHANIEL RICHEY.